(12) United States Patent
Baker et al.

(10) Patent No.: US 6,679,367 B2
(45) Date of Patent: Jan. 20, 2004

(54) TWO-WAY ROLLER CLUTCH ASSEMBLY

(75) Inventors: Richard D. Baker, Ypsilanti, MI (US); Russell E. Monahan, Ann Arbor, MI (US); Tom Houtman, Ann Arbor, MI (US); Shiro Goto, Ann Arbor, MI (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/167,026

(22) Filed: Jun. 11, 2002

(65) Prior Publication Data

US 2003/0226415 A1 Dec. 11, 2003

(51) Int. Cl.[7] ................................................ B60K 41/26
(52) U.S. Cl. ..................................................... 192/219.3
(58) Field of Search ............................... 192/219.3, 45, 192/47, 84.8

(56) References Cited

U.S. PATENT DOCUMENTS

| | | |
|---|---|---|
| 1,321,618 A | 9/1919 | Fynn |
| 1,599,389 A | 9/1926 | Aiken |
| 1,890,973 A | 12/1932 | Drexler et al. |
| 1,948,196 A | 9/1934 | Auperin |
| 2,003,963 A * | 6/1935 | Banker ...................... 192/219.3 |
| 2,038,985 A | 4/1936 | Browne |
| 2,049,798 A | 8/1936 | Booth et al. |
| 2,070,698 A * | 2/1937 | Tinghir ..................... 192/219.3 |
| 2,181,700 A | 11/1939 | Leichensring, Jr. |
| 2,379,829 A | 7/1945 | Russell |
| 4,799,395 A | 1/1989 | Janiszewski |
| 4,867,291 A | 9/1989 | Holman et al. |
| 5,474,164 A | 12/1995 | Berger |
| 5,924,510 A * | 7/1999 | Itoh et al. ..................... 180/197 |
| 5,927,456 A * | 7/1999 | Monahan et al. ............. 192/38 |

* cited by examiner

*Primary Examiner*—Dirk Wright
(74) *Attorney, Agent, or Firm*—Brinks Hofer Gilson & Lione (57) ABSTRACT

An over-running clutch assembly for an automotive transmission comprises an outer race having a cylindrical inner surface and an inner race engaged with a drop shaft of the transmission and having a cammed outer surface coaxial with the cylindrical inner surface and defining a gap therebetween and a roller clutch disposed within the gap; a biasing element to bias the roller clutch to a disengaged position; and an actuator to selectively overcome the biasing element to engage the roller clutch and lock the outer race and inner race and prevent relative rotation between the outer race and inner race, thereby preventing rotation of the drop shaft and movement of the automobile.

25 Claims, 10 Drawing Sheets

TWO-WAY ROLLER CLUTCH ASSEMBLY

TECHNICAL FIELD OF THE INVENTION

This invention relates to an over-running clutch, preferably for use in a manual shift type automotive transmission, which will prevent a vehicle from rolling down a hill when the vehicle starts from a stopped position on the hill. More specifically, the present invention relates to an over-running clutch assembly of a roller/ramp variety which can be controlled for selectively locking up the drop shaft of an automotive transmission.

BACKGROUND

Vehicles with manual transmission have a tendency to roll backwards before accelerating forwards after being stopped on an uphill grade. The driver of the vehicle must accelerate the vehicle smoothly by relieving brake pressure while engaging the clutch to avoid tolling backward into a vehicle positioned behind their own. Preferably, this is done without excessive clutch slippage and without stalling the vehicle. Often, however, the time to transition the right foot from the brake to the throttle pedal and to begin clutch engagement in sufficiently long enough to allow rearward motion to begin. Therefore, the clutch engagement must change the rearward motion of the vehicle to forward motion and then accelerate the vehicle up the hill. In attempting to of this quickly and smoothly without stalling the vehicle, a driver will often overcompensate with a combination of excessively high engine speed and excessive clutch slippage, thereby resulting in increased clutch wear and reduced clutch life.

Current attempts to alleviate this problem using a hydraulically actuated ratchet type device, mounted onto a shaft of an automotive transmission, to prevent rollback of the vehicle. Current devices of this type exhibit reliability issues related to the hydraulic valve and often fail prematurely. Additionally, devices of this type do not disengage immediately upon forward motion, thereby causing a noticeably ratcheting noise as the vehicle begins forward motion.

It would be desirable to provide a device mounted within an automotive transmission that would prevent rearward motion of a vehicle as the vehicle starts from a stopped position on an uphill grade.

A primary object of this invention is therefore to provide an over-running clutch mechanism, such as that disclosed in U.S. Pat. No. 5,927,456 or U.S. Pat. No. 5,924,510, installed within the manual transmission of an automotive vehicle which, when engages, will lock a shaft of the transmission to prevent the vehicle from rolling backward. The device can be selectively actuated by an electromagnetic trigger clutch of by hydraulic, pneumatic or other means.

BRIEF SUMMARY OF THE INVENTION

In accordance with an aspect of the present invention a clutch assembly comprises an outer race fixedly mounted within a transmission having a cylindrical inner surface and being rotatable about an axis, an inner race engaging a shaft of the transmission and having a cammed outer surface coaxial with the cylindrical inner surface and defining a gap therebetween. The inner race is rotatable about the axis with rotational movement relative to the outer race. A plurality of cammed surfaces are formed at spaced apart locations on the outer surface of the inner race. A plurality of rolling elements are positioned between the outer race and the inner race with one of the rolling elements being located at a midpoint of each of the cam surfaces and each of the rolling elements having a diameter less than the gap between the midpoint of the cam surface on the inner race and the cylindrical inner surface of the outer race. A retainer interconnects all of the rolling elements and causes the rolling elements to circumferentially move in unison with one another. The retainer is rotatable about the axis with limited relative rotation with respect to the inner race, a first biasing element is supported in the retainer to radially bias the retainer position relative to the inner race such that each of the rollers is held at the midpoint of the plat cam surfaces in the inner race. An actuation disk is connected to the retainer by a means which allows some axial movement of the activation disk with respect to the retainer toward the case end. The preferred method would include a retainer tab extending axially from one end of the retainer and a notch which is adapted to engage the retainer tab thereby preventing circumferential or relative rotationally motion of the actuation disk relative to the retainer and allowing axial motion of the actuation disk relative to the retainer. A second biasing element is disposed between the actuation disk and the inner axial surface of the case end to bias the actuation disk away from the case end.

The clutch assembly includes an actuator to selectively overcome the second biasing element to force the actuation desk into contact with the case end, wherein rotation of the outer race and case end with respect to said inner race is frictionally transferred to the actuation disk and the retainer, overcoming the first biasing element, thereby moving the rolling elements along the cam surfaces to a position where the rolling elements engage and wedge between the inner and outer races to prevent relative rotation between the inner and outer races, thereby preventing rotation of the drop shaft of the transmission and movement of the vehicle.

DETAILED DESCRIPTION OF THE INVENTION

The following description of the preferred embodiments of the invention is not intended to limit the scope of the invention to these preferred embodiments, but rather to enable any person skilled in the art to make and use this invention.

Figure 1:
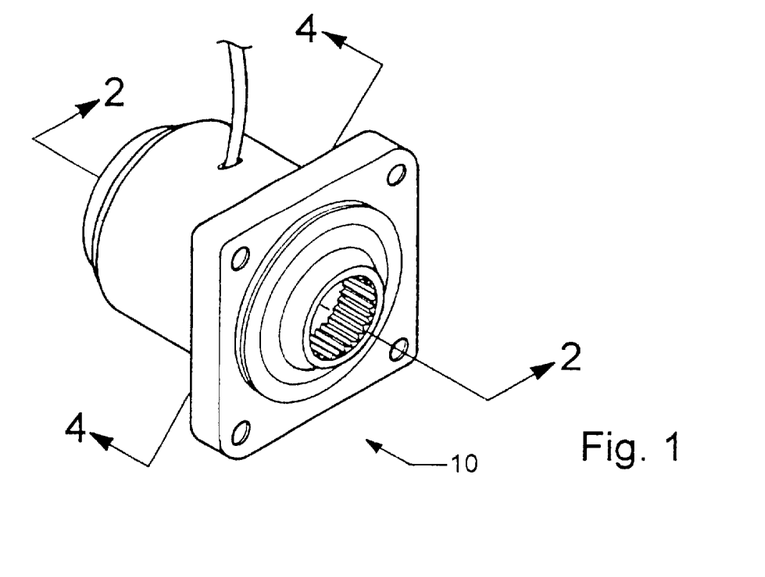
FIG. 1 is a perspective view of a first preferred embodiment of a clutch of the present invention.
Figure 2:
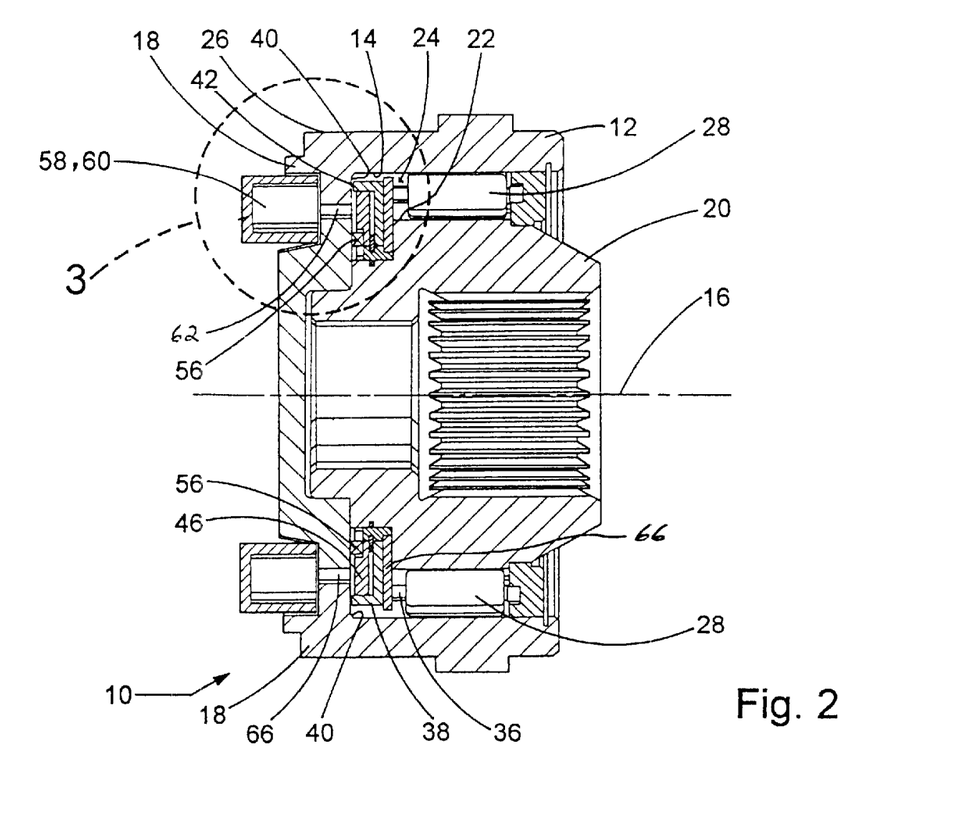
FIG. 2 is side sectional view taken along line 2—2 of FIG. 1.
Figure 3:
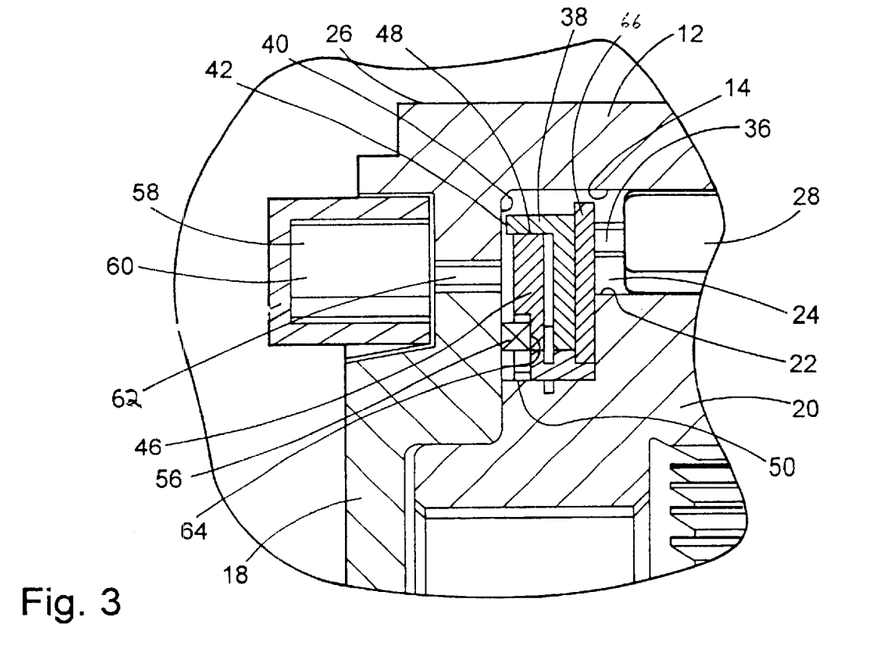
FIG. 3 is an enlarged view of a portion of FIG. 2.

Referring to FIGS. 1–3, an over-running clutch assembly of the present invention is shown generally at 10. The clutch assembly 10 includes an outer race 12 having a cylindrical inner surface 14. The outer race 12 is mounted to a structural component of the transmission housing, and the cylindrical inner surface 14 defines a central axis 16. The outer race 12 includes a case end 18 enclosing a first end of the outer race 12. The clutch assembly 10 also includes an inner race 20 having an outer surface 22 coaxial with the cylindrical inner surface 14 of the outer race 12. The inner surface 14 of the outer race 12 and the outer surface 22 of the inner race 20 define a gap 24 between the inner race 20 and the outer race 12. The inner race 20 is rotatable about the axis 16.

Figure 4:
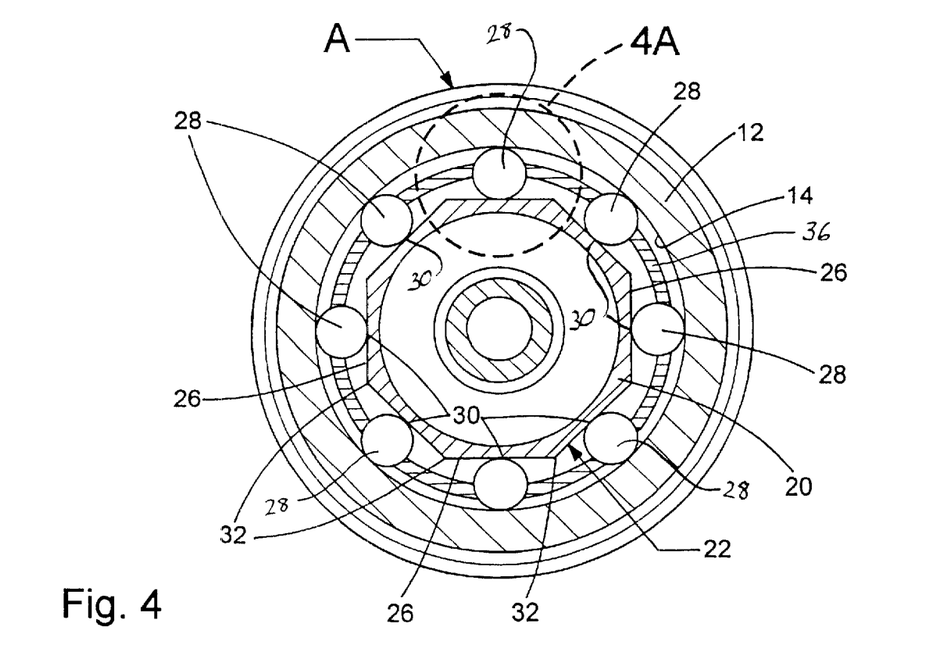
FIG. 4 is a sectional view taken along line 4—4 FIG. 1.

Referring to FIG. 4, the outer surface 22 of the inner race 20 includes a plurality of cam surfaces 26 formed at spaces apart locations on the outer surface 22 of the inner race 20. A plurality of rolling elements 28 are positioned between the outer race 12 and the inner race 20 with one roller 28 being located at a midpoint 30 of each of the cam surfaces 26 of the inner race 20. Preferably, the rollers 28, the inner race 20 and the outer race 12 are made from steel. Due to the high hertzian contact stresses experienced by the rollers 28, the inner surface 14 of the outer race 12 and the outer surface 22 of the inner race 20, the outer surface 14 and outer surface 22 are preferably hardened and ground.

Figure 4A:
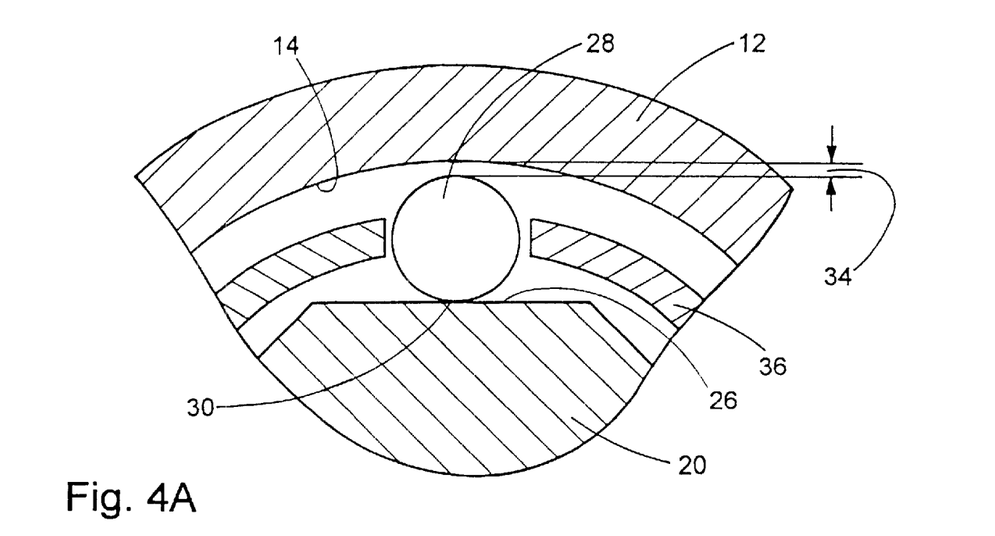
FIG. 4A is an enlarged view of a portion of FIG. 4 showing the clutch in a disengaged state.
Figure 4B:
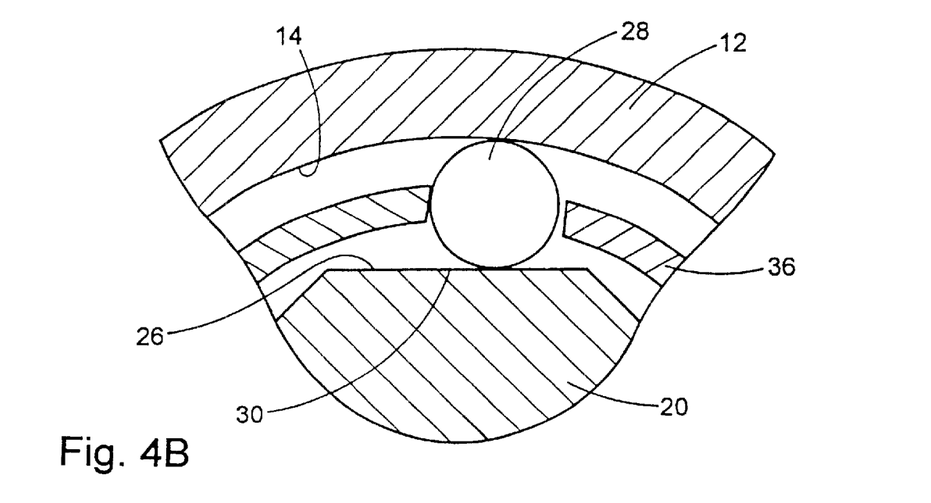
FIG. 4B is an enlarged view similar to FIG. 4A showing the clutch in an engaged state.

The rolling elements 28 have a diameter which is smaller than the distance between the inner surface 14 and the midpoints 30 of the cam surfaces 26, but greater than the distance between outer portions 32 of the cam surfaces 26 and the inner surface 14. Therefore, when t he rolling elements 28 are located at the midpoints 30, there is a clearance 34 as shown in FIG. 4A which allows relative motion between the inner race 20 and the outer race 12. However, when the rolling elements 28 move away from the midpoints 30 toward one side of the cammed surfaces 26, the rolling elements 28 will rotationally lock the inner race 20 to the outer race 12, as shown in FIG. 4B.

Referring again to FIGS. 1–3, a retainer 36 interconnects all of the rolling elements 28 and causes the rolling elements 28 to circumferentially move in unison with one another. The retainer 36 is rotatable about the central axis 16 with limited relative rotational with respect to the inner race 20. The retainer 36 also includes a retainer tab 38 extending axially toward an axial inner surface 40 of the case end 18. A distal end 42 of the retainer tab 38 is adjacent the axial inner surface 40 of the case end 18.

A first biasing element (not shown) is mounted onto the retainer 36 to maintain the position of the retainer 36 with respect to the inner race 20 such that the rolling elements 28 are normally help at the midpoints 30 of the cam surfaces 26. An actuation disk 46 is disposed between the retainer 36 and the inner surface 40 of the case end 18. The actuation disk 46 has an outer diameter 48 and an inner diameter 50. The actuation disk 46 further includes a notch (not shown) located radially about the outer diameter 48. The notch is adapted to engage the retainer tab 38 thereby preventing rotational motion of the actuation disk 46 relative to the retainer 36, while allowing axial motion of the actuation disk 46 relative to the retainer 36. A second biasing element 56 is disposed between the actuation disk 46 and the inner surface 40 of the case end 18 to bias the actuation disk 46 away from the case end 18 and toward the retainer 36. Preferably, the second biasing element 56 is a wave spring.

In the first preferred embodiment, the first biasing element is a centered spring supported by the retaining 36 and engaging the inner race 20 to keep the retainer 36 in position to keep the rolling elements 28 positioned at the midpoints 30 of the cam surfaces 26 to allow the outer race 12 and the inner race 20 to rotate freely with respect to one another. The centering spring includes a plurality of small tangs (not shown) extending radially in or out to engage small notched (not shown) on the hub of the inner race 20. The biasing force of the centering spring must be carefully calibrated for the clutch assembly 10c The centering spring must provide enough force to move the retainer 36 and tolling elements 28 to the neutral position easily when the clutch assembly 10 is disengaged, but not so much force that the friction between the actuation disk 46 and the case end 18 cannot overcome it to act u ate the clutch assembly 10.

The clutch assembly 10 includes an actuator 58 to selectively overcome the second biasing element 56 to force the actuation disk 46 into contact with the case end 18. The actuation disk 46 is free to move axially with respect to the retainer 36, so when the attractive force of the actuator 58 overcomes the force of the second biasing element 56, the actuation disk 46 will move axially toward the inner surface 40 is the case end 18 until the actuation disk 46 contacts the inner surface 40 of the case end 18. When the actuation disk 46 is brought into contact with the inner surface 40 of the case end 18, the relative rotational motion of the outer race 12 and case end 18 with respect to the actuation disk 46 will frictionally be transferred to the actuation disk 46. The actuation disk 46 is linked rotationally and circumferentially to the retainer tabs 38, therefore the rotational movement of the outer race 12 and case end 18 will be transferred through the actuation disk 46 and to the retainer 36.

Rotational movement of the retainer 36 with respect to the inner race 20 moves the rolling elements 28 along the cam surfaces 26 until the rolling elements 28 are no longer at the midpoints 30 of the cam surfaces 26. Since the gap 24 is not large enough to accommodate the diameter of the rolling elements 28, when the rolling elements 28 move out of the midpoints 30 of the cam surfaces 26, the rolling elements 28 become wedged between the outer surface 22 of the inner race 20 and the inner surface 14 of the outer race 12, thereby locking the inner race 20 and outer race 12 together rotationally. The cam surfaces 26 are designed such that when the rolling elements 28 wedge between the inner and outer races 12, 20 an angle is formed between the cam surfaces 26 of the inner race 20 and a line tangent to the inner surface 14 of the outer race 12. In order for the rolling elements 28 to wedge properly between the inner surface 14 of the outer race 12 and the outer surface 22 of the inner race 20, the angle defined by the cam surfaces 26 and a line tangent to the inner surface 14 of the outer race 12 is preferably between approximately 4 degrees and approximately 10 degrees. If the angle is too small, then the hertzian contact force s will be too high, crushing the rolling elements 28 and brinnelling the surfaces 14, 22 of the inner and outer races 12, 20. If the angle is too large, the rolling elements 28 will squirt out from between the inner surface 14 of the outer race 12 and the outer surface 22 of the inner race 20. The cam surfaces 26 and the interaction of the cam surfaces 26 with the rolling elements 28 are described in detail in U.S. Pat. Nos. 4,927,456 and 5,724,510 which are both assigned to NTN Corporation and are hereby incorporated by reference into this application.

In the preferred embodiment, the actuator 58 comprises an electromagnetic coil 60 mounted to the outer race 12. The case end 18 includes a plurality of partially circumferential slots 62 extending through the case end 18 and spaced radially about the case end 18. When energized, the electromagnetic coil 60 produces a magnetic flux which is focused around the slots 62 and concentrated on the actuation disk 46. When the magnetic flux passes through the actuation disk 46, the actuation disk 46 is magnetically drawn toward the axial inner surface 40 of the case end 18. Once the magnetic force of the electromagnetic coil 60 overcomes the force of the second biasing element 56, the actuation disk 46 will start to move toward the inner surface 40 of the case end 18.

Preferably, the actuator 58 is an electromagnetic coil 60, however it is to be understood, that the present invention could be practiced with an actuator 58 of some other type. The actuation disk 46 could be moved through hydraulic or pneumatic means as well as through electromagnetic means.

When the actuator 58 is de-energized, the magnetic attraction of the actuation disk 46 to the axial inner surface 40 of the case end 18 dissipates. As this attraction dissipates, the force of the second biasing element 56 quickly overcomes the dissipating magnetic attraction and forces the actuation disk 46 back away from the inner surface 40 of the case end 18, thereby eliminating the frictional transfer of rotation to the actuation disk 46. Without a rotational force to pull the retainer 36 and rollers 28 out of the neutral position, the first biasing element 44 will force the retainer 36 back into the neutral position and the rollers 28 back into the midpoints 30 of the cam surfaces 26, thereby allowing the inner race 20 to rotate freely with respect to the outer race 12, and un-locking the clutch assembly 10.

The actuation disk 46 includes an annular step 64 extending around the inner diameter 50 of the actuation disk 46. The annular step 64 faces the inner surface 40 of the case end 18, and provides a recess into which the second biasing element 56 is piloted and can collapse into when the actuation disk 46 is drawn to the inner surface 40 of the case end 18. Preferably, the second biasing element 56 is a wave spring that fits within the annular step 64 on the actuation disk 46 and collapses within the annular step 64 when the force of the electromagnetic coil 60 exceeds the spring force of the wave spring 56.

Preferably, the retainer tabs 38 extend directly from the retainer 36, however, alternatively, the clutch assembly 10 could include an actuation spider 66 mounted to the retainer 36 as shown in FIGS. 2 and 3. The actuation spider 66 is rotationally locked to the retainer 36 such that the actuation spider 66 and the retainer 36 functionally act as one component. The first biasing element acts against the retainer 36, holding the retainer 36 in position with respect to the inner race 20. The retainer tabs 38, extend from the actuation spider 66 to engage the notches 54 within the outer diameter 48 of the actuation disk 46.

Figure 5:
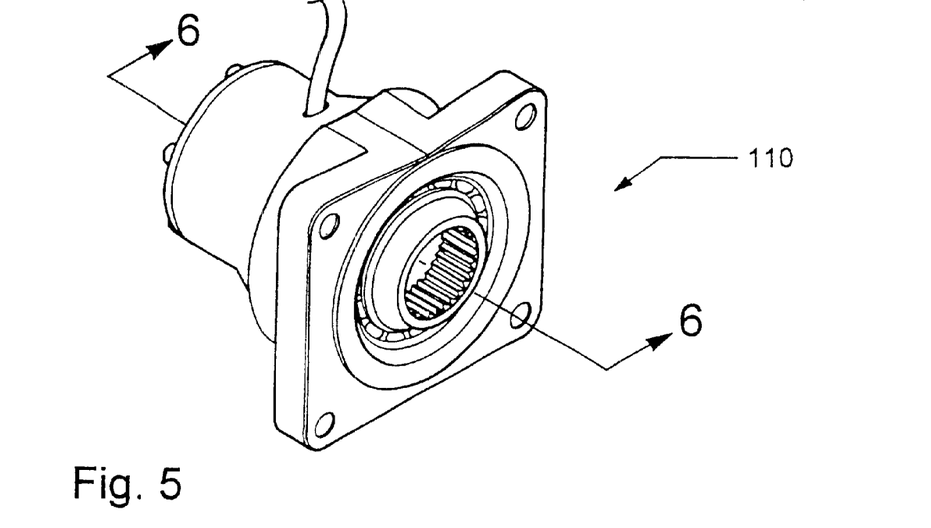
FIG. 5 is a perspective view of a second preferred embodiment of the clutch of the present invention.
Figure 6:
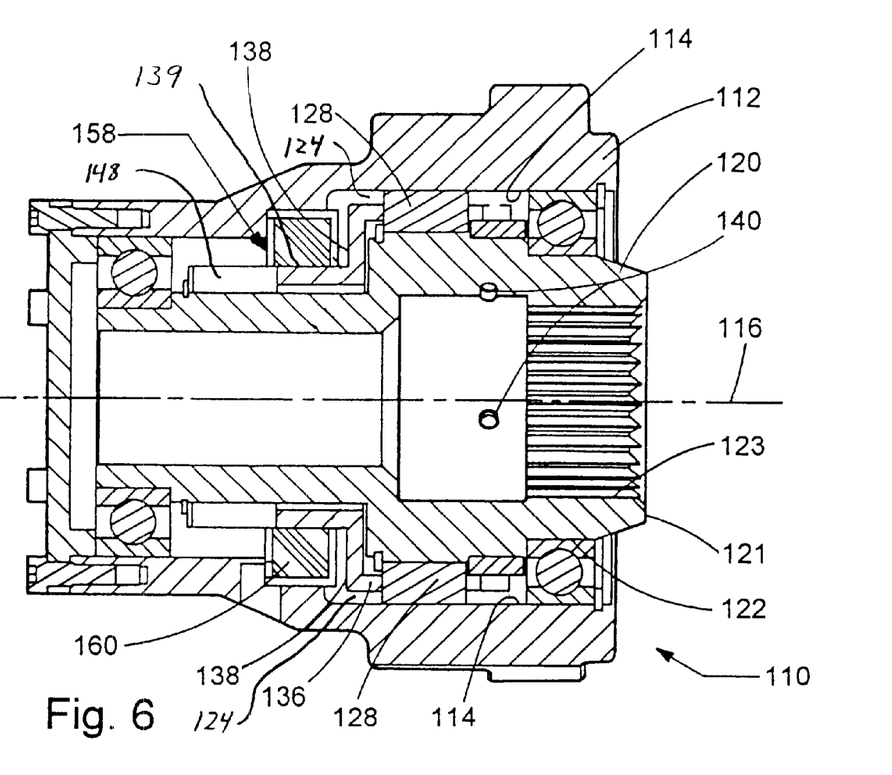
FIG. 6 is a sectional view taken along line 6—6 of FIG. 5.

Referring to FIGS. 5 and 6 a second preferred embodiment is shown generally at 110. The second preferred embodiment also includes an outer race 112 having a cylindrical inner surface 114. The outer race 112 is mounted to a structural component of the transmission housing, and the cylindrical inner 114 surface defines a central axis 116. The clutch assembly 110 also includes an inner race 120 having a first end 121 and an outer surface 122 coaxial with the cylindrical inner surface 114 of the outer race 112. The inner race 120 includes features that allow the inner race to engage a drop shaft of a transmission to prevent rotation of the drop shaft. As shown, the inner race 120 includes an inner diameter 123 which includes splines to allow the inner race 120 to engage the splined end of a transmission drop shaft. The inner surface 114 of the outer race 112 and the outer surface 122 of the inner race 120 define a gap 124 between the inner race 120 and the outer race 112. The inner race 120 is rotatable about the axis 116.

Figure 7:
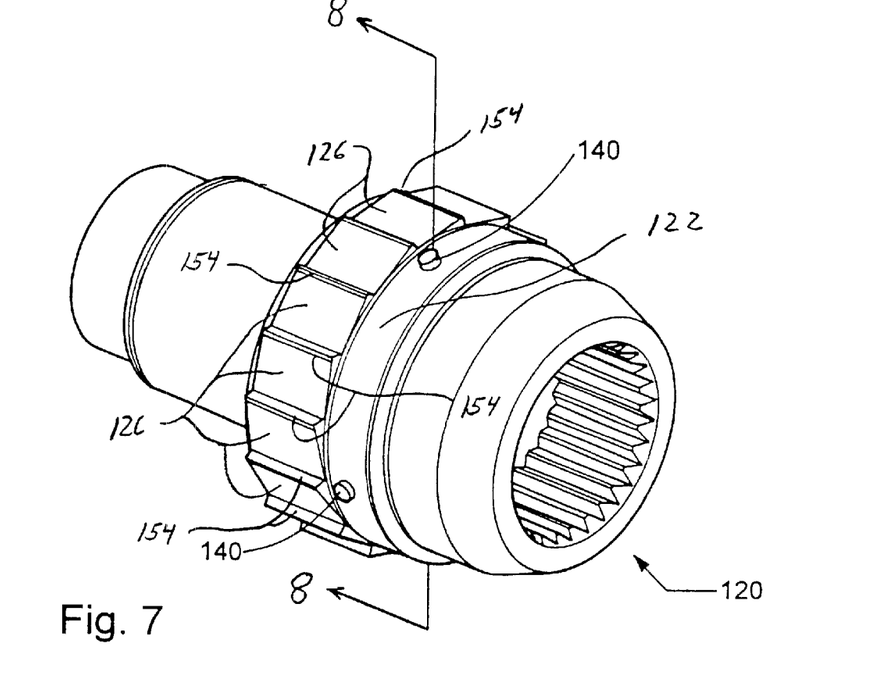
FIG. 7 is a perspective view of an inner race of the second preferred embodiment.
Figure 8:
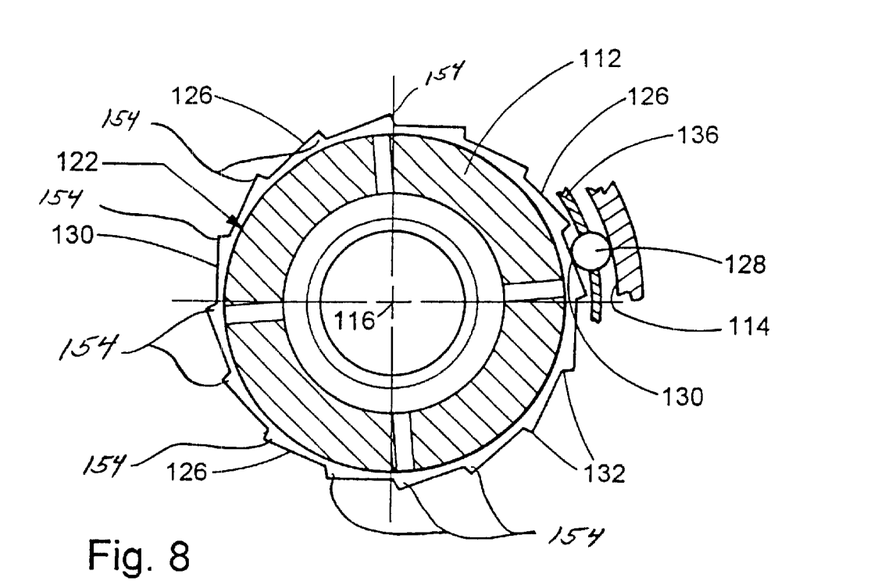
FIG. 8 is a sectional view taken along line 8—8 of FIG. 7.

Referring to FIGS. 7 and 8, the outer surface 122 of the inner race 120 includes a plurality of cam surfaces 126 firmed at spaced apart locations on the outer surface 122 of the inner race 120. A plurality of rolling elements 128 are positioned between the outer race 112 and the inner race 120 with one rolling element 128 being located at a midpoint 130 of each of the cam surfaces 126 of the inner race 120.

Similarly to the first preferred embodiment, the rolling elements 128 have a diameter which is smaller than the distance between the inner surface 114 and the midpoints 130 of the cam surfaces 126, but greater than the distance between the outer portions 132 of the cam surfaces 126 and the inner surface 114. A retainer 136 interconnects all of the rolling elements 128 and causes the rolling elements 128 to circumferentially move in unison with one another. The retainer 136 is rotatable about the axis 116 with limited relative rotation with respect to the inner race 120.

Figure 9:
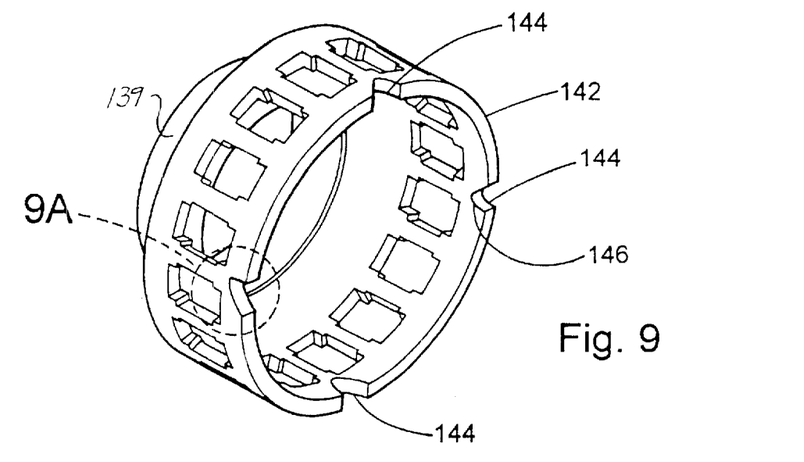
FIG. 9 is a perspective view of a retainer of the second preferred embodiment.
Figure 10:
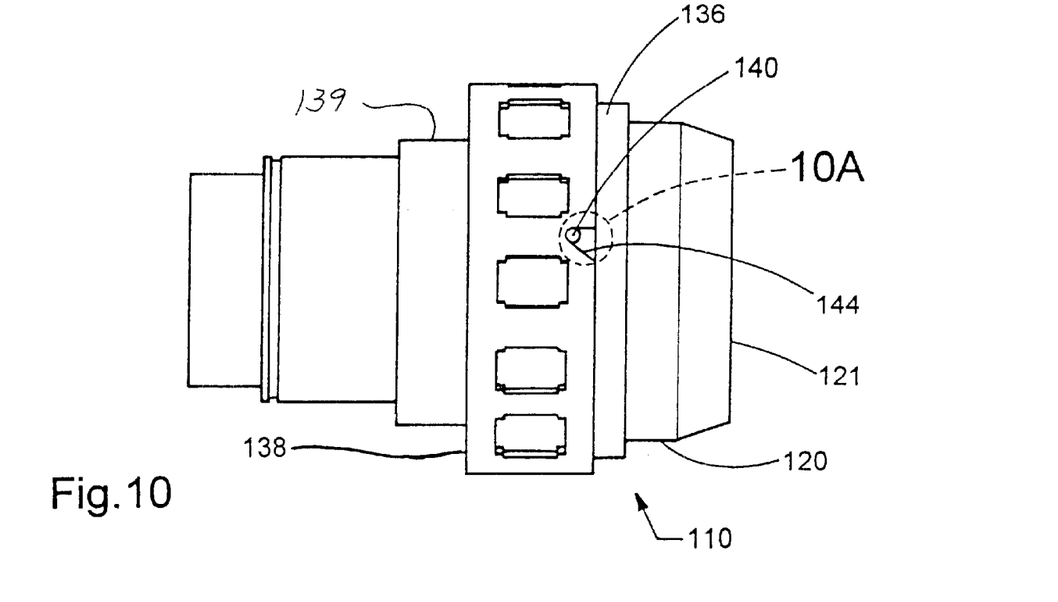
FIG. 10 is a side view of the retainer mounted onto the inner race showing how dowel pins on the inner race engage the notches on the retainer.

In the clutch of the second preferred embodiment, the inner race 120 includes a plurality of dowel pins 140 extending therefrom and the retainer 136 includes a first end 142 having a corresponding plurality of notches 144 having a support surface 146 defined therein, as shown in FIG. 9. The clutch 110 includes a biasing element 148 adapted to bias the retainer 136 toward the first end 121 of the inner race 120, thereby forcing the support surfaces 146 of the notches 144 into engagement with the dowel pins 140, as shown in FIG. 10. Preferably, the biasing element 138 is a wave spring, however other types of biasing elements could be used with substantially the same results. The support surfaces 146 of the notches 144 are spaces about the retainer 136 such that when the support surfaces 146 are engaged with the dowel pins 140, the retainer 136 positions each of the rolling elements 128 at the midpoint 130 of one of the cam surfaces 126.

Figure 10A:
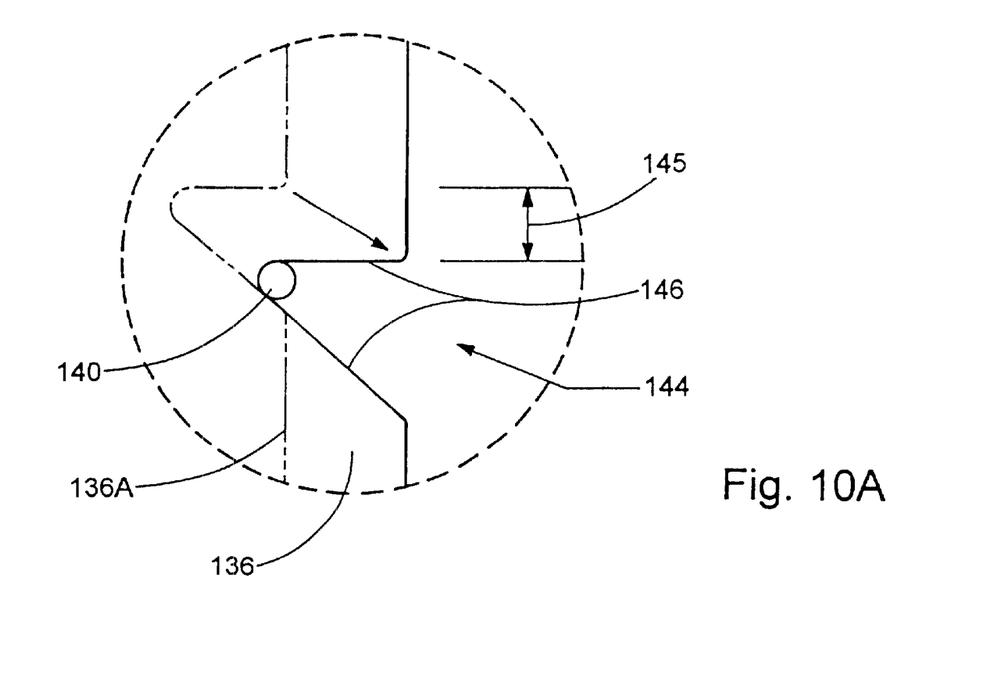
FIG. 10A is an enlarged view of a portion of FIG. 10 showing how the dowel pins engage the notches as the retainer moves axially along the inner race.

Referring again to FIG. 6, the second preferred embodiment also includes an actuator 158 to selectively overcome the biasing element 148 to force the retainer 136 away from the first end of the inner race 120. As the retainer 136 moves axially away from the first end of the inner race 120, the support surfaces 146 within the notches 144 move away from the dowel pins 140. Referring to FIG. 10A, the retainer 136 is shown with the dowel pins 140 in engagement with the support surfaces 146. Further, the retainer is shown in shadow 136A with the retainer moved away from the first end 121 of the inner race 120 and the dowel pins 140 are disengaged from the support surfaces 146, wherein the notches 144 allow limited rotational movement of the retainer relative to the inner race 120, as designated by 145.

Figures 9A, 9B:
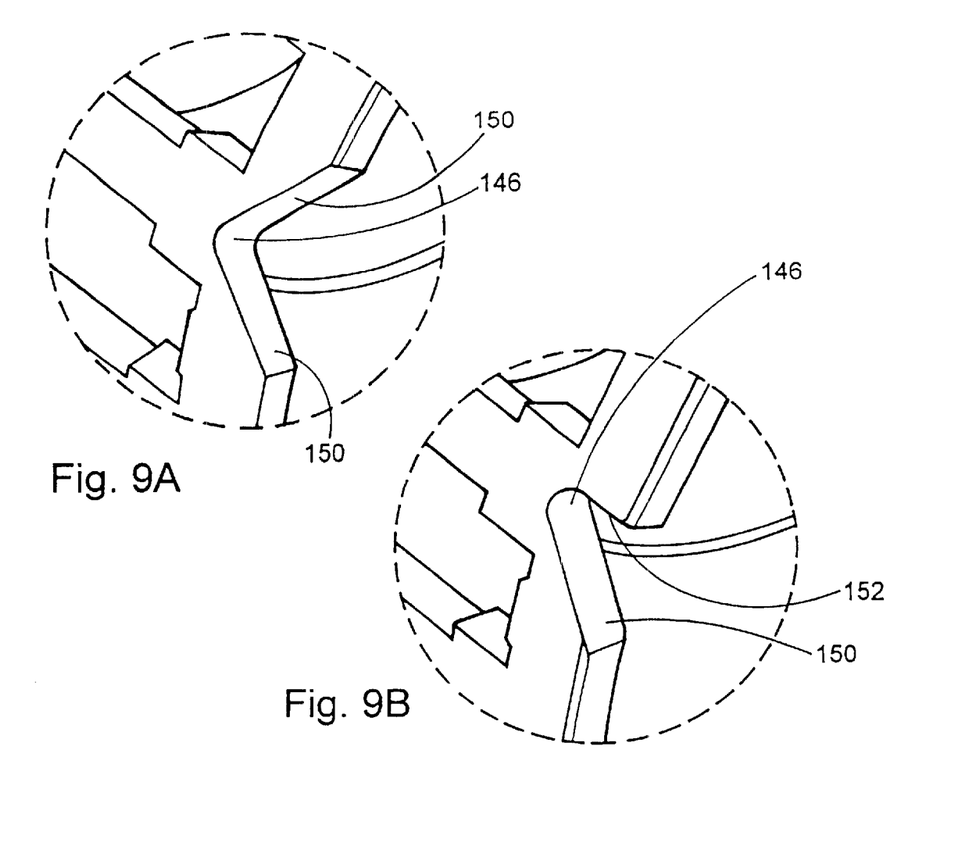
FIG. 9A is an enlarged view of a portion of FIG. 9 showing a notch having two helically angled sides.
FIG. 9B is an enlarged view similar to FIG. 9A showing a notch having one helically angled side.

Preferably, each of the notches 144 includes helical ramped sides 150 extending from the support surface 146 out to the first end of the retainer 136, such that the notches 144 become wider from said support surface 146 to said first end of said retainer 136. As the dowels 140 dis-engage and move axially away from the support surfaces 146, the widening notches provide increasing room to allow rotational movement of the retainer 136 relative to the inner race 120. Each of the notches 144 can include two opposing helical ramped sides 150 to allow rotational movement of the retainer in either direction as shown in FIG. 9A, thereby making the clutch 110 a two-way clutch. Alternatively, each of the notches 144 can include one helical ramped side 150 and one straight side 152, such that the retainer is only allowed relative rotationally movement in one direction as the dowel pins 140 are disengages from the support surfaces 146, as shown in FIG. 9B, thereby making the clutch 110 a one-way clutch.

Rotational movement of the retainer 136 with respect to the inner race 120 moves the rolling elements 128 along the cam surfaces 126 until the rolling elements 128 are no longer at the midpoints 130 of the cam surfaces 126. Since the gap 124 is not large enough to accommodate the diameter of the rolling elements 128, when the rolling elements 128 move out of the midpoints 130 of the cam surfaces 126, the rolling elements 128 become wedged between the outer surface 122 of the inner race 120 and the inner surface 114 of the outer race 112, thereby locking the inner race 120 and the outer race 112 together rotationally.

As discussed above, each of the notches 144 can include wither two opposing helical ramped sides 150 or one helical ramped side 150 and one straight side 152 to make the clutch 110 either a two-way clutch of a one-way clutch. Alternatively, the notches 144 of the retainer 136 could include two opposing helical ramped surfaces 150 and the cam surfaces include a steep tamped portion 154 at one end thereof, as shown in FIG. 7 and 8. The steeped ramped portion 154 will prevent the rolling elements 128 from wedging between the inner race 120 and the outer race 112 when the rolling elements 128 move from the midpoints 130 of the cam surfaces 126 toward the steep ramped portions 154, thereby making the clutch 110 a one-way clutch.

Preferably, the steep ramped portions 154 of the cammed surfaces 126 insure that the angle formed between the cammed surfaces 126 of the inner race 120 and a line tangent to the inner surface 114 of the outer race 112 greater than 10 degrees, thereby allowing the rolling elements 128 to squirt out from between the inner surface 114 of the outer race 112 and the cam surfaces 126 to prevent the clutch 110 from locking in that direction.

In the second preferred embodiment, the actuator 158 comprised an electromagnetic coil 160 mounted to the outer race 112. When energized, the electromagnetic coil 160 produces a magnetic flux which passes between the coil 160 and the retainer 136 to magnetically draw the retainer 136 away from the first end of the inner race 120. Once the magnetic force of the electromagnetic coil 160 overcomes the force of the biasing element 148, the retainer 136 will start to move axially away from the first end of the inner race.

Referring again to FIG. 10, the retainer 136 includes a stepped down portion thereby defining an axial surface 138 and a radial surface 139. The magnetic flux acts upon the axial surface 138 to draw the retainer 136 against the biasing element 148 away from the first end of the inner race 120. Further, it is possible to allow the retainer 136 to move axially for enough such that the axial surface 138 contacts the actuator 158, thereby providing frictional engagement therebetween to transfer rotational movement of the outer race 112 to the retainer 136 to further force relative movement of the retainer 136 with respect to the inner race 120.

Preferably, the actuator 158 in an electromagnetic coil 160, however it is to be understood, that the present invention could be practiced with an actuator 158 of some other type. The retainer 136 could be moved through hydraulic or pneumatic means as well as through electromagnetic means.

When the actuator 158 is de-energized, the magnetic attraction of the retainer 136 to the coil 160 dissipated. As this attraction dissipates, the force of the biasing element 148 quickly overcomes the dissipating magnetic attraction and forces the retainer 136 back toward the first end of the inner race 120. As the retainer 136 moves toward the first end of the inner race 120, the dowel pins 140 will engage the helical ramped sides 150 of the notches 144. As the retainer 136 moves further toward the first end of the inner race 120, the dowel pins 140 will ride along the helical ramped surfaces 150 causing the retainer 136 to rotate relative to the inner race 120 until the dowel pins 140 engage the support surfaces 146, thereby positioning the retainer 136 rotationally such that the rolling elements 128 are positioned at the midpoints 130 of the cam surfaces 126 and allowing the inner race 120 to rotate freely with respect to the outer race 112 to un-lock the clutch assembly 110.

Preferably, the retainer 136 supports the rolling element 128 such that relative axial movement is allowed between the rolling elements 128 and the retainer 136. This is necessary because when the clutch 110 is locked up, and the rolling elements 128 are wedged between the inner and outer races 120, 122, the rolling elements 128 will not be able to move axially relative to the inner race 120. Therefore the retainer 136 must be allowed to move axially relative to the rolling elements 128 in order to allow the retainer to move toward the first end of the inner race 120 when the actuator 158 is de-energized.

Figure 11:
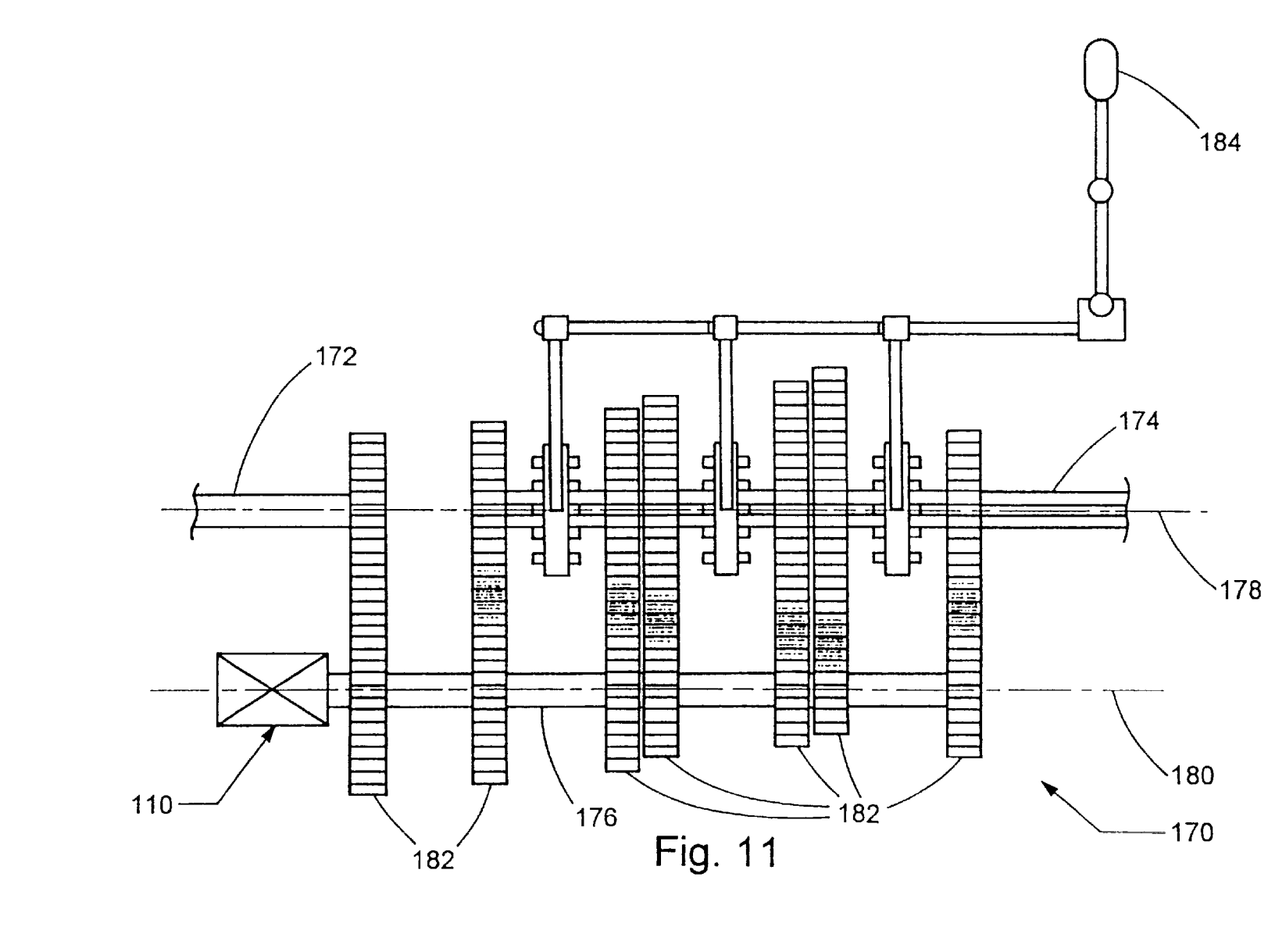
FIG. 11 is a schematic view of a transmission having a clutch of the present invention.

Referring to FIG. 11, a schematic of a manual transmission having a clutch of the present invention is shown generally at 170. The transmission includes an input shaft 172, an output shaft 174, and a drop shaft 176. The input shaft 172 is mounted rotatably within the transmission 170 and is adapted to connect to an engine (not shown) of the automobile to transfer rotational power from the engine to the transmission 170. The output shaft 174 is mounted rotatably within the transmission 170 and is adapted to connect to a drive shaft (not shown) of the vehicle. Preferably, the input shaft 172 and the output shaft 174 are concentric and rotate about a common axis 178.

A drop shaft 176 is mounted within the transmission 170 and is rotatable about an axis 180 which is parallel to and spaced from the common axis 178 of the input shaft 172 and the output shaft 174. The drop shaft 176 is directly engaged with the input shaft 172 such that rotation is transferred from the input shaft 172 to the drop shaft 176. A plurality of gear sets 182 are mounted to the output shaft 174 and are adapted to be selectively engages with the drop shaft 176. A gear shift 194 manipulates the gear sets 182 to determine which of the gear sets 182 are engaged with the drop shaft 176. The gear sets 182 provide a connection between the input shaft 172 and the output shaft 174 through the drop shaft 176, and the gear sets 182 provide varying gear ratios between the input shaft 172 and the output shaft 174.

Figure 12:
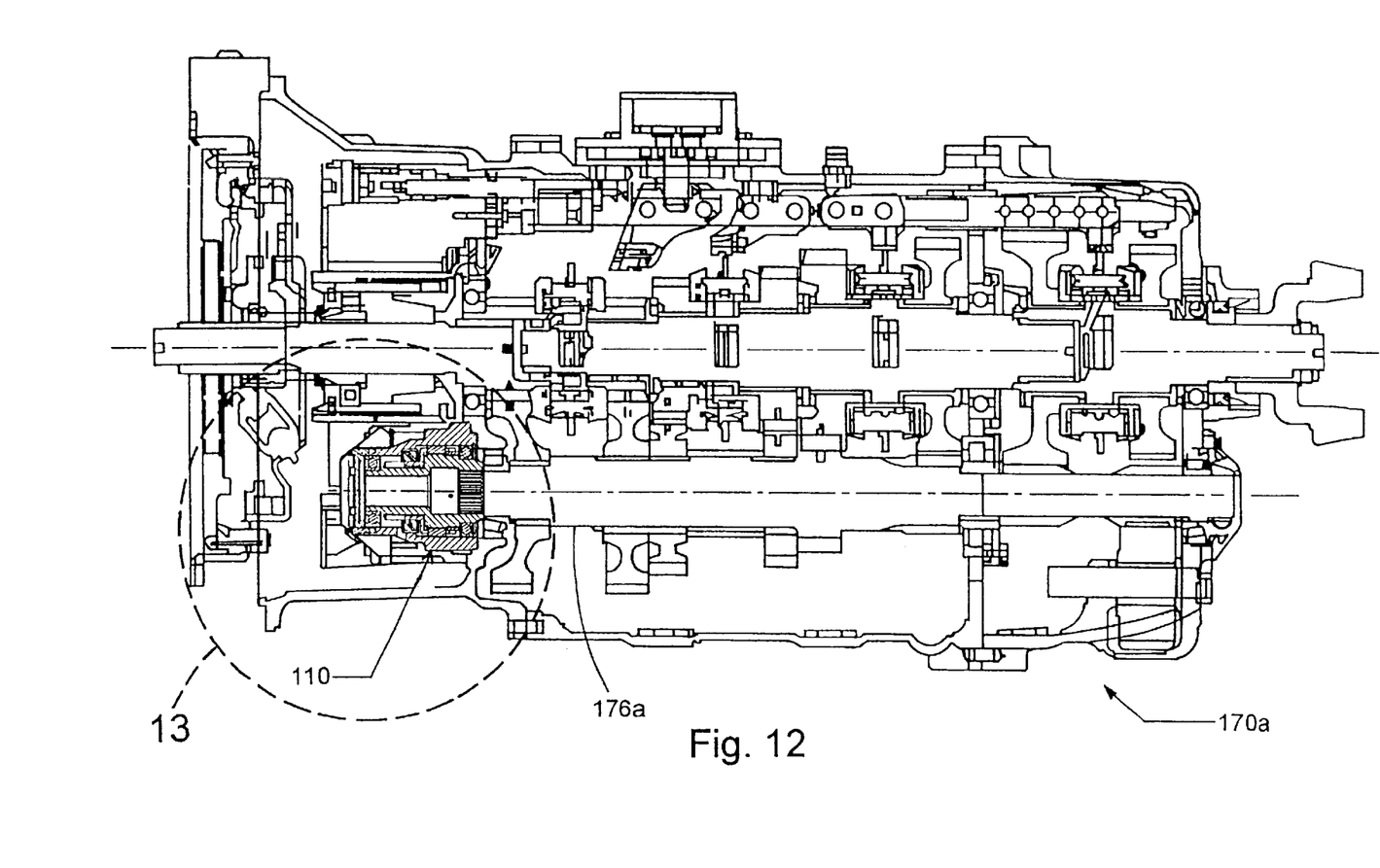
FIG. 12 is a side sectional view of a transmission having a clutch of the present invention.
Figure 13:
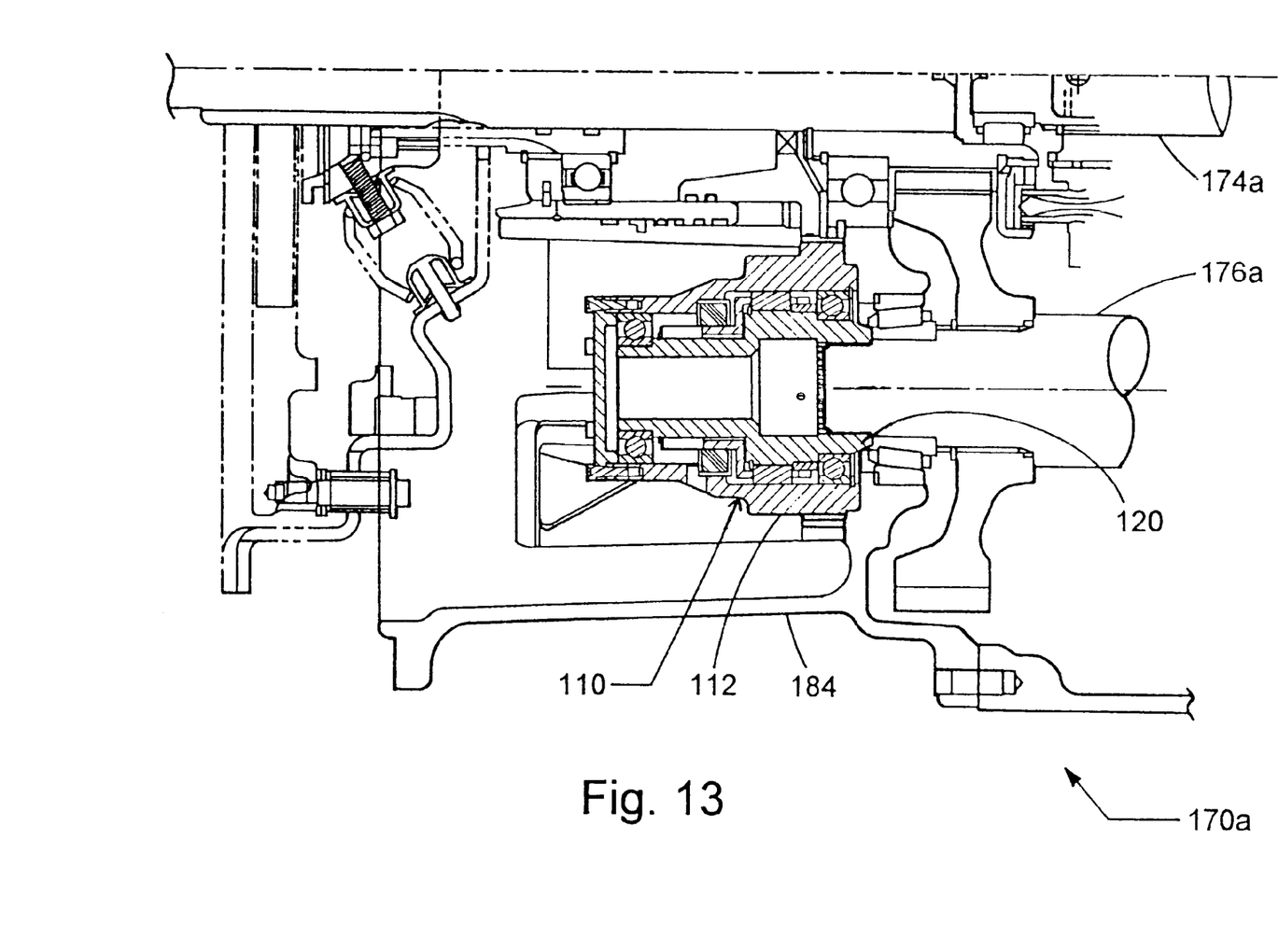
FIG. 13 is an enlarged view of a portion of FIG. 12.

A clutch 110 is fixedly mounted to a structure of the transmission 170 and engages an end of the drop shaft 176 to selectively prevent rotation of the drop shaft 176, thereby preventing rotation of the output shaft 174 and motion of the automobile. Referring to FIG. 12 and 13, a cross sectional view of a manual transmission 170a having a clutch 110 mounted in engagement with an end of the drop shaft 176a is shown. Referring to FIG. 13, the clutch 110 is mounted fixedly to a housing 184 of the transmission 170a such that the outer race 112 is not permitted to rotate relative to the housing 184 of the transmission 170a. The inner race 120 is engaged with an end of the drop shaft 176a such that when the inner race 120 and the outer race 112 are locked rotationally together upon activation of the clutch 110, the drop shaft can not rotate relative to the housing 184, thereby preventing rotation of an output shaft 174a and movement of the vehicle.

The foregoing discussion discloses and describes two preferred embodiments of the invention. One skilled in the art will readily recognize from such discussion, and from the accompanying drawings and claims, that changes and modifications can be made to the invention without departing from the true spirit and fair scope of the invention as defined in the following claims. The invention has been describes in an illustrative matte, and it is to be understood that the terminology which has been used is intended to be in the nature of words of description rather than of limitation.

What is claimed is:

1. An over-running clutch assembly mounted within an automotive transmission comprising:

an outer race having a cylindrical inner surface and being fixedly mounted within the transmission;

an inner race having a first end adapted to engage a drop shaft of the transmission, an outer surface coaxial with said cylindrical inner surface and defining a gap therebetween, said inner race being rotatable about a central axis with allowable rotational movement relative to said outer race;

said outer surface of said inner race including a plurality of cam surfaces formed at spaced apart locations on said outer surface;

a plurality of rolling elements positioned between said outer race and said inner race with each of said rolling elements being located along one of said cam surfaces where said gap is larger than a diameter of said rolling elements;

a retainer interconnecting all of said rolling elements and causing said rolling elements to circumferentially move in unison with one another, said retainer being rotatable about said central axis with limited relative rotation with respect to said inner race, and being biased to a position wherein each of said rolling elements is located along one of said cam surfaces where said gap is larger than a diameter of said rolling elements;

an electronic actuator to selectively allow movement of said retainer relative to said inner race thereby moving said rolling elements along said cam surfaces to a position where said rolling elements engage and wedge between said inner and outer races to prevent relative rotation between said inner and outer races.

2. The over-running clutch of assembly 1 wherein said electronic actuator comprises an electromagnetic coil held within a housing mounted to said outer race and being located relative to said case end, said case end includes slots spaced radially about said case end, wherein when said electromagnetic coil is energizes a magnetic flux is focused around said slots to said actuation disk, thereby magnetically attracting said actuation disk axially toward said axial inner surface of said case end.

3. The over-running clutch assembly of claim 1 comprising:

a case end extending radially inward from said outer race;

a retainer tab extending axially toward an axial inner surface of said case end from said retainer, a distal end of said retainer tab being adjacent said axial inner surface of said case end;

a first biasing element supported on said retainer to radially bias said retainer so as to hold each of said rolling elements into said midpoints of said cam surfaces;

an actuation disk having an outer diameter, an inner diameter and a thickness, disposed between said retainer and said axial inner surface of said case end and including a notch located radially about said outer diameter of said actuation disk, said notch adapted to engage said retainer tab thereby preventing rotational motion of the actuation disk relative to the retainer and allowing axial movement of the actuation disk relative to the retainer;

a second biasing element disposed between said actuation disk and said axial inner surface of said case end to bias said actuation disk away from said case end and toward said retainer;

said actuator adapted to selectively overcome said second biasing element to force said actuation disk into contact with said case end, wherein rotation of said inner race with respect to said outer race and said case end is frictionally transferred to said actuation disk and said retainer, thereby moving said rolling elements along said cam surfaces to a position where said rolling elements engage and wedge between said inner and outer races to prevent relative rotation between said inner and outer races.

4. The over-running clutch assembly of claim 3 wherein said first biasing element is a centered spring held in place between said inner race and said retainer to bias said retainer into a neutral position wherein said rolling elements are help at said midpoints of said cam surfaces on said inner race.

5. The over-running clutch assembly of claim 3 wherein said actuation disk further includes a recess on an axial face of said actuation disk and said second biasing into is a wave spring resting within said recess, said recess providing a cavity into which said wave spring compresses when said actuation disk is forced into contact with said inner surface of said case end.

6. The over-running clutch assembly of claim 1 wherein said inner race includes a plurality of dowel pins extending therefrom and said retainer includes a first end having a corresponding plurality of notches having a support surface defined therein, said over-running clutch further including a biasing element adapted to bias said retainer toward said first end of said inner race, thereby forcing said support surfaces of said ramped notches into engagement with said dowel pins, said support surfaces of said ramped notches being spaces about said retainer such that when said support surfaces are engaged with said dowel pins, said retainer positions each of said rolling elements along one of said cam surfaces where said gap is larger than a diameter of said rolling elements.

7. The over-running clutch assembly of claim 6 wherein said biasing element is a wave spring.

8. The over-running clutch assembly of claim 6 wherein said actuator comprises an electromagnetic coil held within said outer race and being located relative to said retainer, wherein when said magnetic coil is energized a magnetic flux passes between said electromagnetic coil and said retainer, thereby magnetically attracting said retainer axially away from said first end of said inner race such that said dowel pins are no longer engaged with said support surfaces and said notches will allow limited rotational movement of said retainer relative to said inner race.

9. The over-running clutch assembly of claim 8 wherein each of said notches includes helical ramped sides which allow rotational movement of said retainer relative to said inner race when said dowel pins are not engages with said support surfaces.

10. The over-running clutch assembly of claim 8 wherein each of said notches includes one helical ramped side which allows rotational movement of said retainer relative to said inner race in only one direction when said dowel pins are not engaged with said support surfaces.

11. The over-running clutch assembly of claim 8 wherein said retainer supports said rolling elements such that limited relative axial movement is allowed between said rolling elements and said retainer.

12. The over-running clutch assembly of claim 1 wherein each of said cam surfaces includes a steep ramped portion at one end thereof which is adapted to prevent said rolling elements from wedging between said inner race and said outer race when said rolling elements move toward said steep ramped portions.

13. A manual transmission comprising:
    an input shaft adapted to connect to an engine of an automobile;
    an output shaft adapted to connect to the drive shaft of an automobile, said input shaft and said output shaft being concentric and rotatable about a first axis;
    a drop shaft rotatable about a second axis parallel to and spaces from said first axis and being engaged with said input shaft;
    a plurality of gear sets mounted to said output shaft, each gear set adapted to selectively interconnect said output shaft and said drop shaft to provide varying gear ratios between said input shaft and said output shaft;
    a roller clutch having an electronic actuator mounted within said housing and engaging an end of said drop shaft to selectively prevent rotation of said drop shaft, thereby preventing motion of said automobile.

14. The transmission of claim 13 wherein said clutch comprises:
    an outer race having a cylindrical inner surface and being fixedly mounted within said housing;
    an inner race having a first end adapted to engage said drop shaft, and outer surface coaxial with said cylindrical inner surface and defining a gap therebetween, said inner race being rotatable about a central axis with allowable rotational movement relative to said outer race;
    said outer surface of said inner race including a plurality of cam surfaces formed at spaced apart location on said outer surface;
    a plurality of rolling elements positioned between said outer race and said inner race with each of said rolling elements being located along one of said cam surfaces where said gap is larger than a diameter of said rolling elements;
    a retainer interconnecting all of said rollers and causing said rollers to circumferentially move in unison with one another, said retainer being rotatable about said central axis with limited relative rotational with respect to said inner race, and being biased to a position wherein each of said rolling elements is located along one of said cam surfaces where said gap is larger than said diameter of said rolling elements;
    said electronic actuator adapted to selectively allow movement of said retainer relative to said inner race, thereby moving said rolling elements along said cam surfaces to a position where said rolling elements engage and wedge between said inner and outer races to prevent relative rotational between said inner and outer races.

15. The transmission of claim 14 wherein each of said cam surfaces includes a steep ramped portion at one end thereof which is adapted to prevent said rolling elements from wedging between said inner race and said outer race when said rolling elements move toward said steep ramped portions.

16. The transmission of claim 14 wherein said inner race includes a plurality of dowel pins extending therefrom and said retainer includes a first end having a corresponding plurality of notches having a support surface defined therein, said over-running clutch further including a biasing element adapted to bias said retainer toward said first end of said inner race, thereby forcing said support surfaces of said notches into engagement with said dowel pins, said support surfaces of said notches being spaced about said retainer such that when said support surfaces are engaged with said dowel pins, said retainer positions each of said rolling elements along on of said cam surfaces where said gap is larger than said diameter of said rolling elements.

17. The transmission of claim 16 wherein said biasing element is a wave spring.

18. The transmission of claim 16 wherein said electronic actuator comprises an electromagnetic coil held within said outer race and being located relative to said retainer, wherein when said magnetic coil is energized a magnetic flux passes between said electromagnetic coil and said retainer, thereby magnetically attracting said retainer axially away from said first end of said inner race such that said dowel pins are no longer engaged with said support surfaces and said notches will allow limited rotational movement of said retainer relative to said inner race.

19. The transmission of claim 18 wherein each of said notches includes helical ramped sides which allow rotational movement of said retainer relative to said inner race when said dowel pins are not engages with said support surfaces.

20. The transmission of claim 18 wherein each of said notches includes one helical ramped side which allows rotational movement of said retainer relative to said inner race in only one direction when said dowel pins are not engaged with said support surfaces.

21. The transmission of claim 18 wherein said retainer supports said rolling elements such that limited relative axial movement is allowed between said rolling elements and said retainer.

22. The transmission of claim 14 further comprising:
    a case end extending radially inward from said outer race;
    a retainer tab extending axially toward an axial inner surface of said case end from said retainer, a distal end of said retainer tab being adjacent said axial inner surface of said case end;
    a first biasing element supported on said retainer to radially bias said retainer so as to hold each of said rolling elements along one of said cam surfaces where said gap is larger than said diameter of said rolling elements;
    an actuation disk having an outer diameter, and inner diameter and a thickness, disposed between said retainer and said axial inner surface of said case end and including a notch located radially about said outer diameter of said actuation disk, said notch adapted to engage said retainer tab thereby preventing rotational motion of the actuation disk relative to the retainer and allowing axial movement of the actuation disk relative to the retainer;

a second biasing element disposed between said actuation disk and said axial inner surface of said case and to bias said actuation disk away from said case end and toward said retainer;

said actuator adapted to selectively overcome said second biasing element to force said actuation disk into contact with said case end, wherein rotation of said inner race with respect to said outer race and said case end is frictionally transferred to said actuation disk and said retainer, thereby moving said rolling elements along said cam surfaces to a position where said rolling elements engage and wedge between said inner and outer races to prevent relative rotation between said inner and outer races.

23. The transmission of claim 22 wherein said actuator comprises an electromagnetic coil help within a housing mounted to said outer race and being located relative to said case end, said case end including slots spaced radially about said case end, wherein when said electromagnetic coil is energized a magnetic flux is focused around said slots to said actuation disk, thereby magnetically attracting said actuation disk axially toward said axial inner surface of said case end.

24. The transmission of claim 22 wherein said first biasing element is a centering spring help in place between said inner race and said retainer to bias said retainer into a neutral position wherein said rolling elements are held along one of said cam surfaces where said gap is larger than said diameter of said rolling elements.

25. The transmission of claim 22 wherein said actuation disk further includes a recess on an axial face of said actuation disk and said second biasing element is a wave spring resting within said recess, said recess providing a cavity into which said wave spring compresses when said actuation disk is forced into contact with said inner surface of said case end.

* * * * *